United States Patent [19]
Bohn et al.

[11] Patent Number: 5,459,611
[45] Date of Patent: Oct. 17, 1995

[54] BEAM SPLITTER/COMBINER WITH PATH LENGTH COMPENSATOR AND METHOD FOR MAKING THE SAME

[75] Inventors: David D. Bohn, Fort Collins; Jesse M. Gerrard, Loveland, both of Colo.

[73] Assignee: Hewlett-Packard Company, Palo Alto, Calif.

[21] Appl. No.: 108,359

[22] Filed: Aug. 18, 1993

[51] Int. Cl.[6] .................................................. G02B 27/10
[52] U.S. Cl. .................................................. 359/618
[58] Field of Search ........................ 250/226; 359/583, 359/634, 638, 637, 629

[56] References Cited

U.S. PATENT DOCUMENTS

| | | | |
|---|---|---|---|
| 4,709,144 | 11/1987 | Vincent | 250/226 |
| 4,870,268 | 9/1989 | Vincent et al. | 250/226 |
| 4,926,041 | 5/1990 | Boyd | 250/226 |
| 5,040,872 | 8/1991 | Steinle | 359/638 |

OTHER PUBLICATIONS

Tribastone, Claude et al., The Photonics Design & Applications Handbook, Book 3 (1993), p. H-343.

Primary Examiner—Akm E. Ullah

[57] ABSTRACT

A beam splitter/path length compensator assembly for use in a color imaging assembly, comprising a beam splitter for splitting a polychromatic imaging light beam into a plurality of color component beams, and an integrally formed, transparent path length compensator device for differentially adjusting the focus distances of the color component beams. The beam splitter is encased within the path length compensator device. A color imaging assembly utilizing the beam splitter/path length compensator assembly for forming spatially separated, color component images of an object on a unitary image plane is also disclosed. A method for producing a beam splitter/path length compensator assembly is also disclosed. An optical assembly utilizing a beam combiner/path length compensator assembly for spatially and spectrally combining a plurality of color component optical beams into a combined optical beam having a unitary optical axis is also disclosed.

5 Claims, 4 Drawing Sheets

BEAM SPLITTER/COMBINER WITH PATH LENGTH COMPENSATOR AND METHOD FOR MAKING THE SAME

BACKGROUND OF THE INVENTION

The present invention relates generally to color imaging assemblies which employ multilayered dichroic composites for generating spatially separated, color component images of an object on an image plane. The present invention also relates generally to color combiners which employ multilayered dichroic composites for combining separate beams of light of different spectral ranges into a single combined beam. The invention relates particularly to a beam splitter/combiner with a path length compensator which is used in association with dichroic composites.

A number of different dichroic composites are described in U.S. Pat. No. 4,709,144 for COLOR IMAGER UTILIZING NOVEL TRICHROMATIC BEAMSPLITTER AND PHOTOSENSOR of Vincent, and U.S. Pat. No. 4,870,268 for COLOR COMBINER AND SEPARATOR AND IMPLEMENTATIONS of Vincent et al., which are hereby incorporated by reference for all that is disclosed therein. An optical scanner which employs a beam splitter is described in U.S. Pat. No. 4,926,041 for OPTICAL SCANNER of Boyd, which is hereby incorporated by reference for all that is disclosed therein. A beam splitter/combiner with a path length compensator is described in U.S. Pat. No. 5,040,872 for BEAM SPLITTER/COMBINER WITH PATH LENGTH COMPENSATOR of Steinle, which is hereby incorporated by reference for all that is disclosed therein.

The phrase "beam of light" as used herein is broadly defined as any narrow shaft of light having light rays traveling in the same general direction. The phrase "beam of light" therefore includes the light which emanates from an object and passes through the aperture of an imaging lens as well as the converging cone of light which emerges from the lens and is focused on an image plane.

A prior art color imaging assembly 10, as shown in FIG. 1, forms spatially separated color component images, e.g. blue, green and red images 12, 14, 16 of an object 20, such as the scan line of an optical scanner, on a unitary image plane PP. The color imaging assembly 10 may include an imaging lens assembly, shown schematically at 22, adapted for receiving a polychromatic imaging light beam 24, having a central beam axis CC, from the object 20 for imaging the object on the unitary image plane PP. A dichroic beam splitter 26 is disposed obliquely in the path of the imaging light beam 24 for splitting the imaging light beam 24 into a plurality of parallel, spatially separated, color component beams 40, 42, 44 having parallel central optical axes BB, GG, RR. The color component beams 40, 42, 44 may be received by a photosensor assembly 50, which is positioned in alignment with the unitary image plane PP, and which is adapted to transmit sensor signals to a suitable data processing and data storage unit (not shown). The photosensor assembly 50 may be comprised of a plurality of coplanar linear photosensor arrays 52, 54, 56 which are aligned with each of the plurality of component beams 40, 42, 44. Each of the linear photosensor arrays 52, 54, 56 is adapted to transmit a signal representative of a color component image 12, 14, 16 of the object 20 which is focused on the unitary image plane PP.

A path length compensator 60 is disposed between the beam splitter 26 and the unitary image plane PP for refractively compensating for differences in optical path lengths of the plurality of color component beams 40, 42, 44 such that the color component image 12, 14, 16 provided by each of the color component beams 40, 42, 44 is focused on the unitary image plane PP.

The beam splitter 26 may be of the type described in U.S. Pat. Nos. 4,709,144 and 4,870,268 incorporated by reference above. Specifically, the beam splitter 26 shown in FIG. 1 consists of a precisely ground and polished glass bar or plate comprising multiple layers of selected multilayer dielectric interference optical filter coatings 30, 32, 34 (hereinafter "dichroic layer(s)"). Due to the complexity of the coatings 30, 32, 34, the beam splitter 26 is usually comprised of a glass substrate such as BK-7, upon which the coatings 30, 32, 34 are applied. Each of the coatings 30, 32, 34 typically have twenty to thirty unique layers.

The beam splitter 26 shown in FIG. 1 comprises a first dichroic layer 30 which reflects light in the blue spectral band, a second dichroic layer 32 which reflects light in the green spectral band, and a third dichroic layer 34 which reflects light in the red spectral band.

The path length compensator 60 may be of the type described in U.S. Pat. No. 5,040,872 incorporated by reference above. Specifically, the path length compensator 60 shown in FIG. 1 is comprised of a prism 61 with an angled, planar surface 62 and a stairstep-shaped lower portion 64. The lower portion 64 is comprised of a first planar surface 66 positioned a predetermined distance from image plane PP, a second planar surface 68 positioned a predetermined distance from image plane PP, and a third planar surface 70 positioned a predetermined distance from image plane PP. The first surface 66 is positioned in alignment with component beam 40, the second surface 68 is positioned in alignment with component beam 42, and the third surface 70 is positioned in alignment with component beam 44.

The path length compensator prism 61 and beam splitter 26 are constructed of material having the same or nearly the same index of refraction to eliminate optical aberrations. The beam splitter 26 is typically constructed from a glass material such as BK-7. However, due to the expense of fabricating the path length compensator prism 61 from a glass material, the path length compensator prism 61 is typically molded from a plastic material such as polycarbonate. A medium 72 such as air having an index of refraction less than the index of refraction of the prism 61 interfaces with the prism surfaces 66, 68, 70.

In order for the color component beams 40, 42, 44 to pass through the path length compensator 60 and be received by the photosensor assembly 50 linear photosensor arrays 52, 54, 56, the beam splitter 26 must be positioned in fixed, oblique relationship to the path of the imaging light beam 24. As described above, the path length compensator 60 may comprise an angled, planar surface 62 upon which the beam splitter 26 may be fixedly mounted using an optical adhesive medium 80. Specifically, the beam splitter 26 comprises a planar surface 28 which is positioned directly adjacent to the path length compensator angled, planar surface 62, with an optical adhesive medium 80 disposed therebetween. To achieve adequate bonding of the surfaces 28, 62 by the optical adhesive medium 80, each of the surfaces 28, 62 must be of optical quality in terms of flatness and surface roughness.

Mounted in an optical scanner (not shown), the color imaging assembly 10 may operate at temperatures of, e.g., between −5° C. and 40° C. The beam splitter 26 planar surface 28 is typically a glass surface and the path length compensator 60 surface 62, which interfaces with surface 28 with an optical adhesive medium 80 disposed therebetween, is typically a plastic surface. Because of the difference in the properties of glass and plastic, any differential change in temperature of the color imaging assembly 10 causes the plastic surface 62 of the path length compensator 60 to expand or contract at a higher rate than the glass surface 28 of the beam splitter 26. More specifically, the coefficient of thermal expansion of plastic may be an order of magnitude higher than the coefficient of thermal expansion of glass. For example, the coefficient of thermal expansion of a plastic material such as polycarbonate may be, e.g., $6.6 \times 10^{-5}/°C$., and the coefficient of thermal expansion of a glass material such as BK-7 may be, e.g., $7.1 \times 10^{-6}/°C$. Due to the difference in the rates of expansion of these materials, the beam splitter planar surface 28 and the path length compensator surface 62 may experience varying degrees of stress because of the differential changes in temperature of the color imaging assembly 10 under standard operating conditions. This stress may become too high for the optical adhesive medium 80 disposed between the surfaces 28, 62 to adequately maintain optical contact between the surfaces 28, 62, causing the color imaging assembly 10 to fail.

This, it is an object of the present invention to provide a color imaging assembly which eliminates the need for an optical adhesive medium between a beam splitter means and a path length compensator device.

It is a further object of the present invention to provide a color imaging assembly which compensates for the differences in the coefficients of thermal expansions of a glass beam splitter means and a plastic path length compensator device.

It is also an object of the present invention to provide a color imaging assembly which includes a beam splitter means housed within a unitary path length compensator device.

It is a further object of the present invention to provide a method for producing a beam splitter means housed within a unitary path length compensator device.

It is a further object of the present invention to provide a color imaging assembly which includes a beam combiner means housed within a unitary path length compensator device.

SUMMARY OF THE INVENTION

The present invention may comprise a beam splitter/path length compensator assembly for use in a color imaging assembly. The beam splitter/path length compensator may comprise a beam splitter means for splitting a polychromatic imaging light beam into a plurality of color component beams. The beam splitter/path length compensator assembly may also comprise an integrally formed, transparent path length compensator device comprising a path length compensator means for differentially adjusting the focus distances of the color component beams, wherein the beam splitter means is encased within the path length compensator device.

The present invention may also comprise a color imaging assembly for forming spatially separated, color component images of an object on a unitary image plane. The color imaging assembly may comprise an imaging means receiving a polychromatic imaging light beam, having a central beam axis, from the object for imaging the object on the unitary image plane. The color imaging assembly may also comprise a beam splitter/path length compensator assembly. The beam splitter/path length compensator assembly may comprise a beam splitter means having a plurality of parallel, color component beam reflecting layers disposed obliquely in the path of the polychromatic imaging light beam for splitting the polychromatic imaging light beam into a plurality of parallel, spatially and spectrally separated, color component beams having optical axes positioned perpendicular to the unitary image plane. The beam splitter/path length compensator assembly may also comprise a unitary path length compensator device. The path length compensator device preferably comprises a beam splitter housing means for securely holding the beam splitter means and for spatially separating the beam splitter means from the unitary image plane. The path length compensator device preferably also comprises path length compensator means disposed between the beam splitter means and the unitary image plane for refractively compensating for differences in optical path lengths of the plurality of color component beams, whereby each of the color component beams provides a focused color component image of the object on the unitary image plane.

The present invention may further comprise a beam splitter/path length compensator assembly such as that described above for use in a color imaging assembly for forming spatially separated, color component images of an object on a unitary image plane.

The present invention may further comprise a method for producing a beam splitter/path length compensator assembly for use in a color imaging assembly for forming spatially separated, color component images of an object on a unitary image plane. First, a beam splitter means such as the beam splitter means described above is provided. Next, a mold means is provided for producing a unitary path length compensator device such as that described above. The beam splitter means is then placed in the mold means, and a molten plastic material is injected into the mold means. The plastic material is allowed to cure to a solid state, wherein the plastic material is transparent upon curing.

The present invention may further comprise an optical assembly for spatially and spectrally combining a plurality of color component optical beams into a combined optical beam having a unitary optical axis. The optical assembly may comprise component light source means for generating a plurality of component optical beams having different spectral ranges. The optical assembly may also comprise a beam combiner/path length compensator assembly. The beam combiner/path length compensator assembly may comprise a beam combiner means having a plurality of component beam reflecting layers disposed obliquely in the paths of the color component optical beams for combining the color component optical beams into a combined optical beam having a unitary optical axis. The beam combiner/path length compensator assembly may further comprise a unitary path length compensator device. The path length compensator device preferably comprises beam combiner housing means for securely holding the beam combiner means and for spatially separating the beam combiner means from the component light source means. The path length compensator device preferably also comprises path length compensator means disposed between the beam combiner means and the component light source means for refractively compensating for differences in optical path lengths of the plurality of color component beams. The optical assembly may further comprise focusing means receiving the combined optical beam for focusing the combined optical beam to a common focal point.

BRIEF DESCRIPTION OF THE DRAWINGS

Illustrative and presently preferred embodiments of the invention are shown in the accompanying drawings in which.

DETAILED DESCRIPTION OF THE INVENTION

Figure 1:
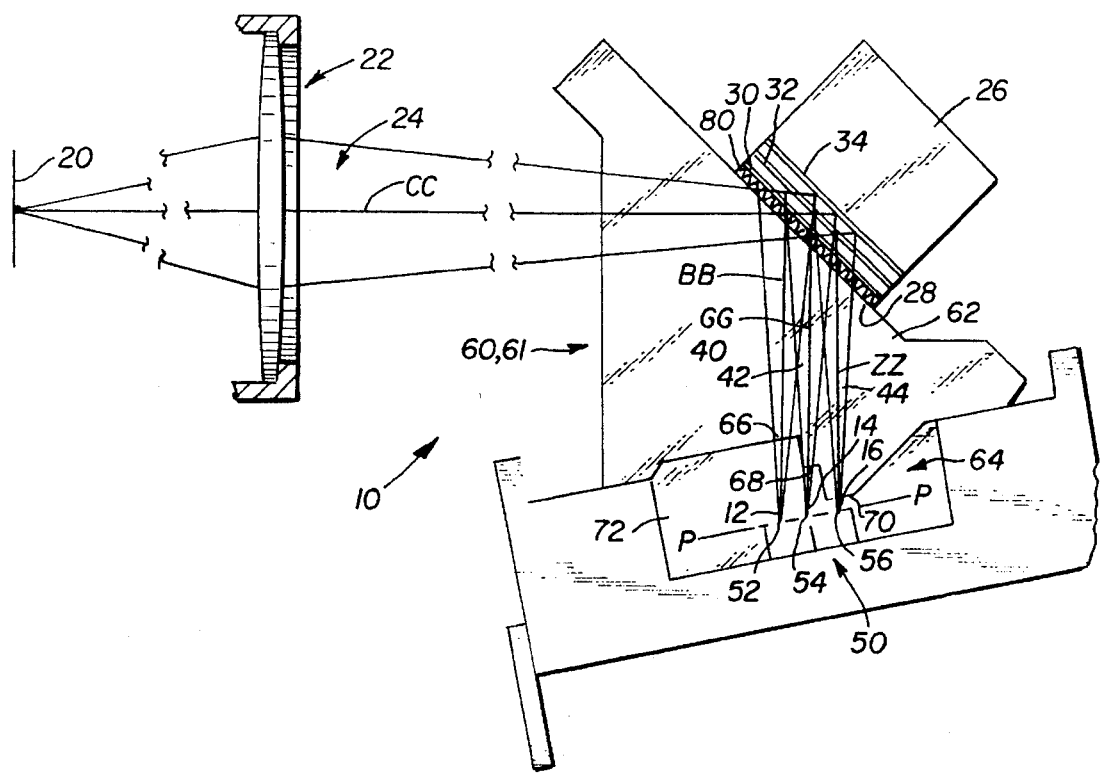
FIG. 1 is a side elevation view of a prior art color imaging assembly.
Figure 2:
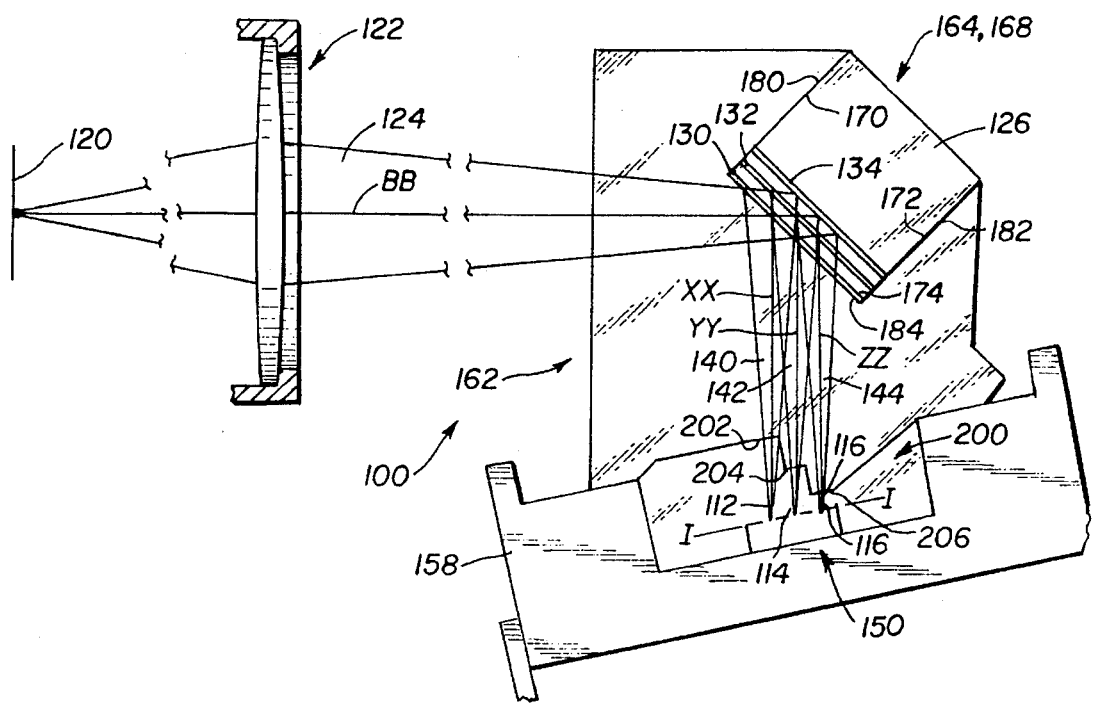
FIG. 2 is a side elevation view of a color imaging assembly employing a first embodiment of the beam splitter/path length compensator assembly of the present invention.
Figure 3:
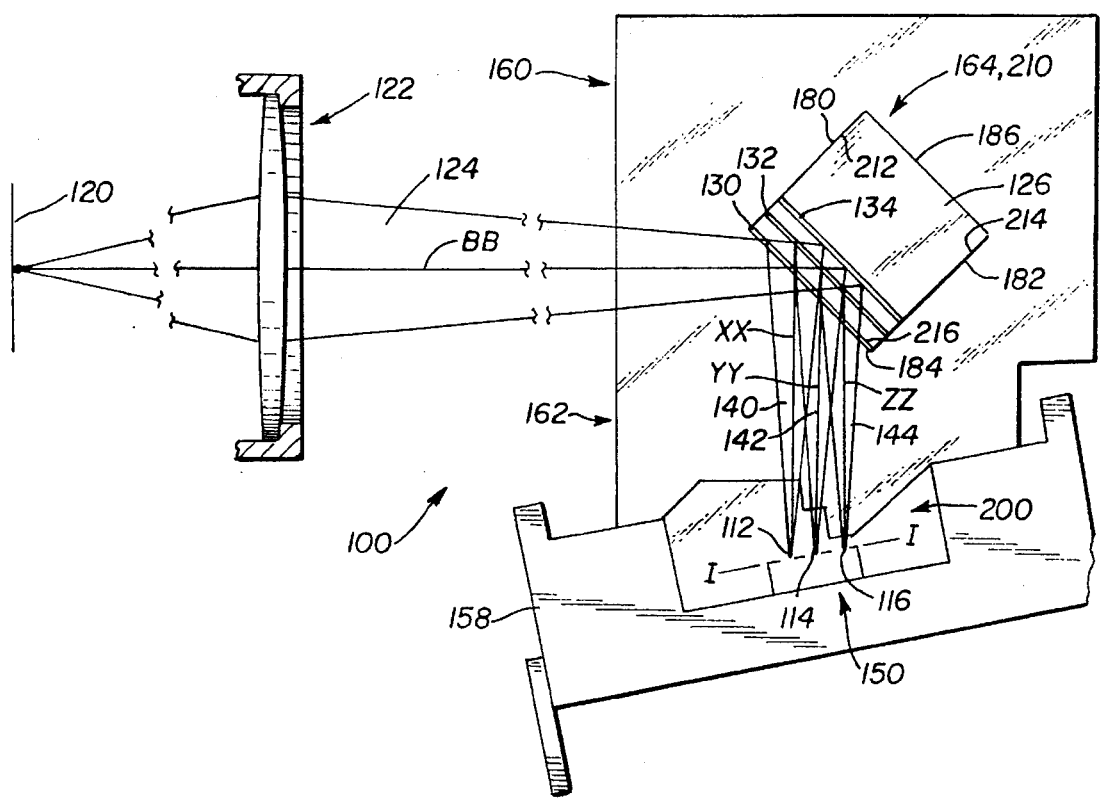
FIG. 3 is a side elevation view of a color imaging assembly employing a second embodiment of the beam splitter/path length compensator assembly of the present invention.

As shown in FIGS. 2 and 3, the present invention may comprise a color imaging assembly 100 for forming spatially separated, color component images 112, 114, 116 of an object 120 on a unitary image plane II. The object 120 to be imaged may be a line object such as the scan line of an optical scanner such as that described in U.S. Pat. No. 4,926,041 incorporated by reference above.

The color imaging assembly 100 may comprise an imaging means 122 receiving a polychromatic imaging light beam 124, having a central beam axis BB, from the object 120 for imaging the object 120 on the unitary image plane II. The imaging means 122 may comprise a double Gauss lens assembly or other imaging lens assembly.

A photosensor assembly 150, which is positioned in alignment with the unitary image plane II, may be provided to receive the color component beams 140, 142, 144 and transmit sensor signals to a suitable data processing and data storage unit (not shown). The photosensor assembly 150 may be of the type described in U.S. Pat. No. 4,709,144 incorporated by reference above. Specifically, the photosensor assembly 150 is preferably comprised of a plurality of coplanar linear photosensor arrays 152, 154, 156 which are aligned with each of the plurality of component beams 140, 142, 144. Each of the linear photosensor arrays 152, 154, 156 is adapted to transmit a signal representative of a color component image 112, 114, 116 of the object 120 which is focused on the unitary image plane II. The photosensor assembly 150 may be mounted on a sensor support member 158.

As shown in FIGS. 2 and 3, the color imaging assembly 100 may also comprise a beam splitter/path length compensator assembly 160 which may also be mounted on the sensor support member 158, spaced apart from and in alignment with the photosensor assembly 150. The beam splitter/path length compensator assembly 160 preferably comprises a beam splitter means 126 which may be of the type described in U.S. Pat. Nos. 4,709,144 and 4,870,268 incorporated by reference above. Specifically, the beam splitter means 126 may consist of a precisely ground and polished glass bar or plate comprising a plurality of parallel, color component beam reflecting layers 130, 132, 134 disposed obliquely in the path of the imaging light beam 124. The layers 130, 132, 134 split the polychromatic imaging light beam 124 into a plurality of parallel, spatially and spectrally separated, color component beams 140, 142, 144 having optical axes XX, YY, ZZ, respectively, positioned perpendicular to the unitary image plane II. The beam splitter means 126 shown in FIGS. 2 and 3 comprises a first color component beam reflecting layer 130 which reflects light in the blue spectral band, a second color component beam reflecting layer 132 which reflects light in the green spectral band, and a third color component beam reflecting layer 134 which reflects light in the red spectral band.

The beam splitter/path length compensator assembly 160 may also comprise a unitary path length compensator device 162. The path length compensator device 162 preferably comprises a beam splitter housing means 164 for securely holding the beam splitter means 126 and for spatially separating the beam splitter means 126 from the unitary image plane II.

The path length compensator device 162 preferably also comprises path length compensator means 200 disposed between the beam splitter means 126 and the unitary image plane II for transmitting at least one of the spatially and spectrally separated color component beams 140, 142, 44 therethrough for refractively compensating for differences in optical path lengths of the plurality of color component beams 140, 142, 144.

The path length compensator 162 and beam splitter 126 are preferably constructed of material having the same or nearly the same index of refraction to eliminate optical aberrations. The beam splitter 126 may be constructed from a glass material such as BK-7. However, due to the expense of fabricating the path length compensator device 162 from a glass material, the path length compensator device 162 is preferably molded from a plastic material such as polycarbonate. FIG. 2 illustrates a first embodiment of the path length compensator device 162 of the beam splitter/path length compensator assembly 160.

As shown in FIG. 2, the beam splitter housing means 164 of the path length compensator device 162 may comprise a cavity 168 with a first sidewall 170, a second sidewall 172, and a bottom wall 174. The beam splitter means 126 may be partially encased within the cavity 168 so that the beam splitter means 126 is supported on three sides 180, 182, 184 thereof by the sidewalls 170, 172 and the bottom wall 174 of the cavity 168. More specifically, the beam splitter means 126 shown in FIG. 2 comprises a first sidewall 180 which interfaces with the cavity sidewall 170, a second sidewall 182 which interfaces with the cavity sidewall 172, and a bottom wall 184 which interfaces with the cavity bottom wall 174.

The path length compensator means 200 of the path length compensator device 162 may be of the type described in U.S. Pat. No. 5,040,872 incorporated by reference above. Specifically, the path length compensator means 200 preferably comprises a plurality of steps 202, 204, 206 which are adapted to refractively compensate for differences in optical path lengths of the color component beams 140, 142, 144.

The path length compensator means 200 is adapted so that each of the color component beams 140, 142, 144 provides a focused color component image 112, 114, 116, respectively, of the object 120 on the unitary image plane II.

A second embodiment of the path length compensator device 162 of the beam splitter/path length compensator assembly 160 is illustrated in FIG. 3. As shown in FIG. 3, the beam splitter housing means 164 of the path length compensator device 162 may comprise a cavity 210 with a first sidewall 212, a second sidewall 214, a bottom wall 216, and a top wall 218. The beam splitter means 126 may be fully encased within the cavity 210 so that the beam splitter means 126 is supported on all four sides 180, 182, 184, 186 thereof by the sidewalls 212, 214, the bottom wall 216, and the top wall 218 of the cavity 210. More specifically, the beam splitter means 126 shown in FIG. 3 comprises a first sidewall 180 which interfaces with the cavity sidewall 212, a second sidewall 182 which interfaces with the cavity sidewall 214, a bottom wall 184 which interfaces with the cavity bottom wall 216, and a top wall 186 which interfaces with the cavity top wall 218.

The path length compensator means 200 of the path length compensator device 162 shown in FIG. 3 may be substantially identical to that described above with reference to FIG. 2.

The beam splitter housing means 164 of FIGS. 2 and 3 eliminates the need for an optical adhesive medium between the beam splitter surface 184 and the path length compensator surface portion 174, FIG. 2 or surface portion 216, FIG. 3. Thus, the beam splitter surface 184 directly interfaces with the path length compensator surface portion 174, FIG. 2 or surface portion 216, FIG. 3. More specifically, the cavities 168, 210 maintain the beam splitter means 126 within the path length compensator device 162 by providing support to the beam splitter means 126 on more than one side (e.g. 180, 182, 184, FIG. 2; 180, 182, 184, 186, FIG. 3) thereof. Mounted in an optical scanner (not shown), the color imaging assembly 100 may operate at temperatures of, e.g., between −5° C. and 40° C. Due to differences in the coefficients of thermal expansion between the glass beam splitter means 126 and the plastic path length compensator device 162, any differential change in temperature will cause the path length compensator device 162 to expand or contract at a higher rate than the beam splitter means 126. However, encasing the beam splitter means 126 on more than one side thereof greatly reduces the effects of the difference in the rate of expansion and contraction of the beam splitter means 126 and the path length compensator device 162. To further reduce such effects, the beam splitter/path length compensator assembly 160 may be produced such that the beam splitter means 126 is compressively supported within the beam splitter housing means 164 of the path length compensator device 162, as described in further detail below with respect to the method for producing the beam splitter/path length compensator assembly 160. More specifically, such compressive support allows the plastic path length compensator device 162 to expand with a differential increase in operating temperature while maintaining supportive contact between the cavity walls (e.g. 170, 172, 174, FIG. 2; 212, 214, 216, 218, FIG. 3) of the path length compensator device 162 and the beam splitter walls 180, 182, 184, 186 of the glass beam splitter means 126. Contraction of the plastic path length compensator device 162 with a differential decrease in operating temperature merely increases the compressive force applied by the beam splitter housing means 164 to the glass beam splitter means 126. Thus, the unitary path length compensator device 162 maintains the beam splitter means 126 in proper alignment with both the path length compensator means 200 and the photosensor assembly 150 and greatly reduces the possibility for failure of the color imaging assembly 100 under standard operating temperatures.

Figure 4:
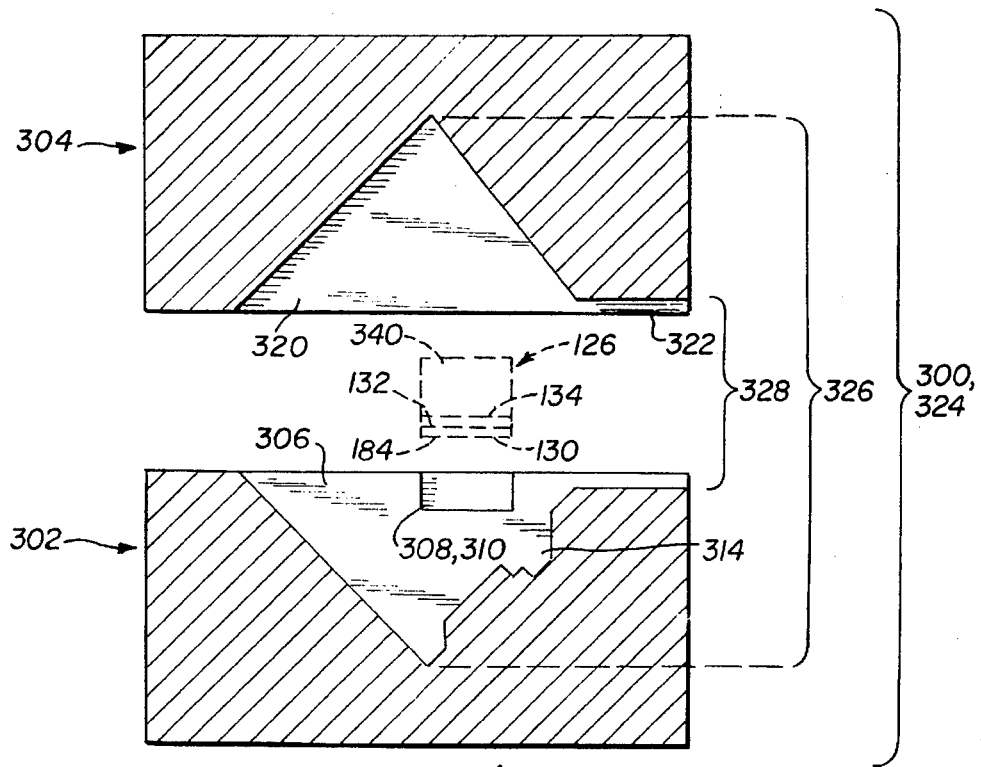
FIG. 4 is a cross-sectional, side elevation view of a mold apparatus for producing the beam splitter/path length compensator assembly of FIG. 3.
Figure 5:
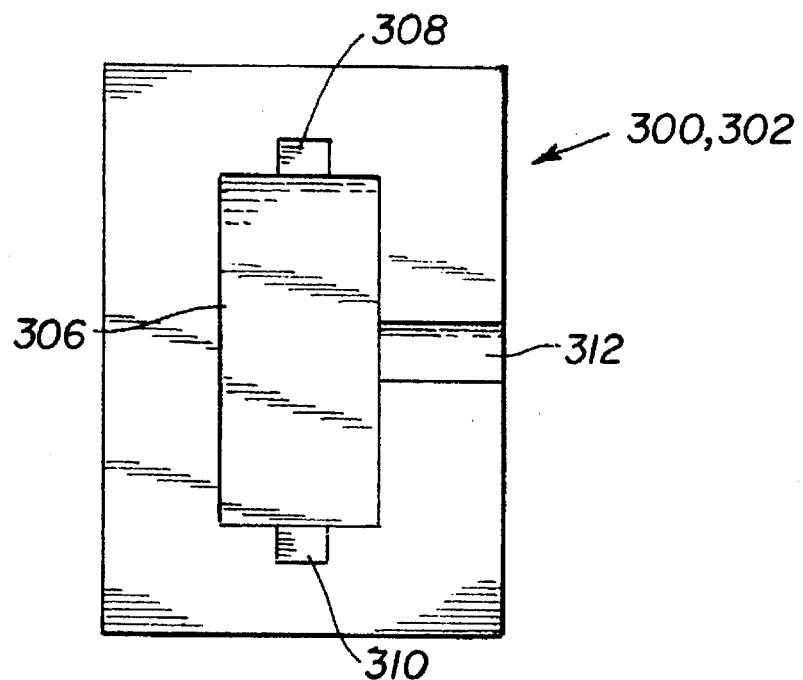
FIG. 5 is a top plan view of the lower half of the mold apparatus of FIG. 4.
Figure 6:
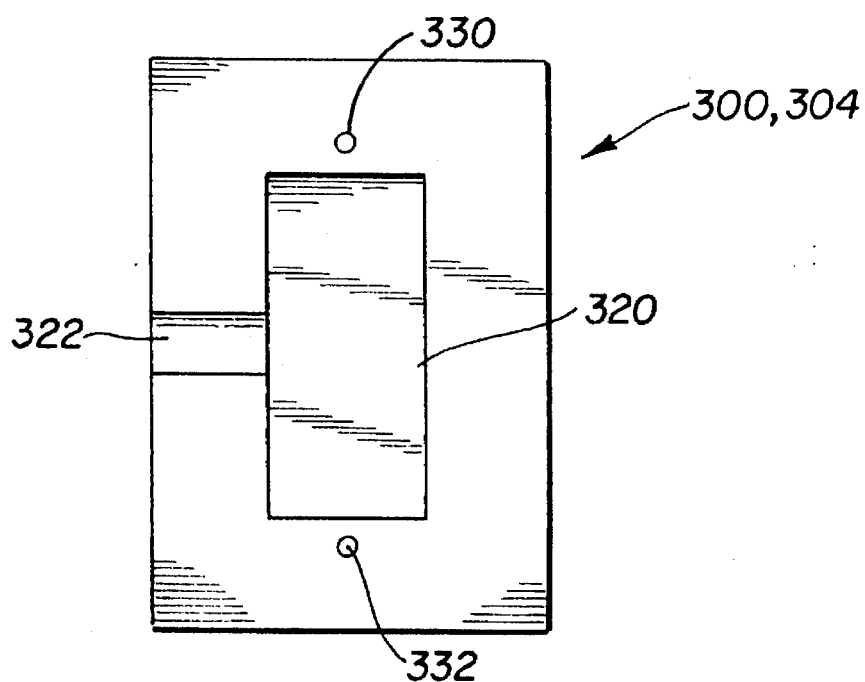
FIG. 6 is a top plan view of the upper half of the mold apparatus of FIG. 4.

FIGS. 4, 5 and 6 schematically illustrate a mold means 300 for producing the path length compensator device 162 of the beam splitter/path length compensator assembly 160 shown in FIG. 3. The mold means 300 may comprise a lower mold half 302 and an upper mold half 304. The lower mold half 302 as shown in FIGS. 4 and 5 may comprise a lower path length compensator cavity 306, a first beam splitter support cavity 308, a second beam splitter support cavity 310, and a lower mold fill gate portion 312. The lower path length compensator cavity 306 preferably comprises a stairstep-shaped portion 314 which corresponds to the shape of the path length compensator means (200, FIGS. 2 and 3). The remainder of the lower path length compensator cavity 306 may comprise the shape illustrated in FIG. 4 or any desired shape. The upper mold half 304 as shown in FIGS. 4 and 6 may comprise an upper path length compensator cavity 320 and an upper mold fill gate portion 322. The upper path length compensator cavity 320 may comprise the triangular shape illustrated in FIG. 4 or any desired shape so that the resulting cavities 306, 320 produces a path length compensator device (162, FIGS. 2 and 3) which supports the beam splitter means (126, FIGS. 2 and 3) on more than one side thereof.

To produce the beam splitter/path length compensator assembly 160 of the embodiment shown in FIG. 3, the beam splitter means 126 is first heated to a temperature of, e.g., approximately 200° C. to slightly expand the glass material of the beam splitter means 126. The mold means 300 is also heated in preparation for receiving the beam splitter means 126 and injected material. Referring now to FIGS. 4 and 5, the beam splitter means 126, which in this embodiment is comprised of a glass bar, is then placed within the first and second beam splitter support cavities 306, 308 of the lower mold half 302. The beam splitter means 126 is positioned so that the bottom wall 184 of the beam splitter means 126 (i.e. the side of the beam splitter means 126 which comprises the dichroic layers 130, 132, 134) faces downwardly as shown in FIG. 4. It can be seen in FIG. 5 that most of the beam splitter means (not shown in this figure) will be suspended over the lower path length compensator cavity 306, with the ends of the beam splitter means being supported by the first and second beam splitter support cavities 308, 310. Next, the upper mold half 304, FIGS. 4 and 6, is placed on and in alignment with the lower mold half 302, FIGS. 4 and 5, and are sealed together to form a unitary mold apparatus 324. A unitary path length compensator cavity 326 is formed by the lower path length compensator cavity 306 and the upper path length compensator cavity 320, and a unitary mold fill gate 328 is formed by the lower mold fill gate portion 312 and the upper fill gate portion 322. The upper mold half 304 may also comprise nylon pins 330, 332 positioned in alignment with the first and second beam splitter support cavities 306, 308 of the lower mold half 302 to provide additional support to the beam splitter means 126 within the mold apparatus 324. Positioned on the first and second beam splitter support cavities 306, 308, the upper portion 340 of the beam splitter means 126 extends into the upper path length compensator cavity 320.

Next, a molten plastic material such as an optical quality polycarbonate at a temperature of, e.g., between about 230° C. and 280° C. is injected into the mold fill gate 328 by a conventional insert injection molding apparatus (not shown)

to completely fill the path length compensator cavity 326. An exemplary insert injection molding apparatus which may be used to inject the molten plastic material into the mold fill gate 328 is illustrated in Tribastone, Claude et al., *The Photonics Design and Applications Handbook*, Book 3 (1993), p. H-343, which is hereby incorporated by reference for all that is disclosed therein. After injection, the plastic material is allowed to slowly cure at room temperature for, e.g., between about 1 minute and 5 minutes, and preferably about 2 minutes.

Figure 7:
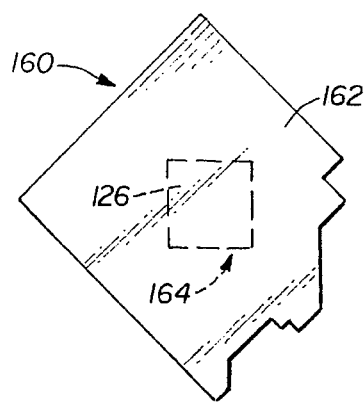
FIG. 7 is a cross-sectional, side elevation view of the beam splitter/path length compensator assembly of FIG. 3.
Figure 8:
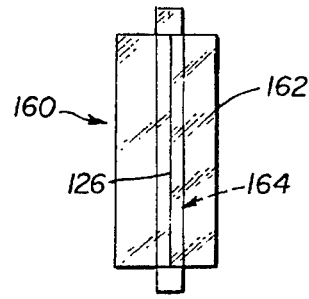
FIG. 8 is a top plan view of the beam splitter/path length compensator assembly of FIG. 3.

As shown in FIGS. 6 and 7 and as described above, the beam splitter/path length compensator assembly 160 comprises a beam splitter means 126 housed within a beam splitter housing means 164 of the path length compensator device 162. Heating the beam splitter means 126 prior to its insertion within the mold means 300 expands the glass material of the beam splitter means 126. As the surrounding plastic material slowly cures at room temperature, the plastic material contracts, resulting in the beam splitter means 126 being compressively supported within the beam splitter housing means 164. It is to be understood that the method for producing the beam splitter/path length compensator assembly 160 of FIG. 2 may be substantially identical to the method described above, except that the shape of the lower mold half 302 and the shape of the upper mold half 304 correspond to the shape of the path length compensator device 162 shown in FIG. 2 as described above.

The beam splitter/path length compensator assembly 160 produced by the above method also comprises a key portion (not shown) formed by the plastic being injected into the mold fill gate (328, FIG. 4). The key portion is removed prior to use of the beam splitter/path length compensator assembly 160 in a color imaging assembly (e.g. 100, FIGS. 2 and 3).

It is to be understood that the above-described method of insert injection molding a molten plastic material around a glass beam splitter to encase the beam splitter in plastic may be extended beyond the employment of beam splitters used in optical scanners.

Figure 9:
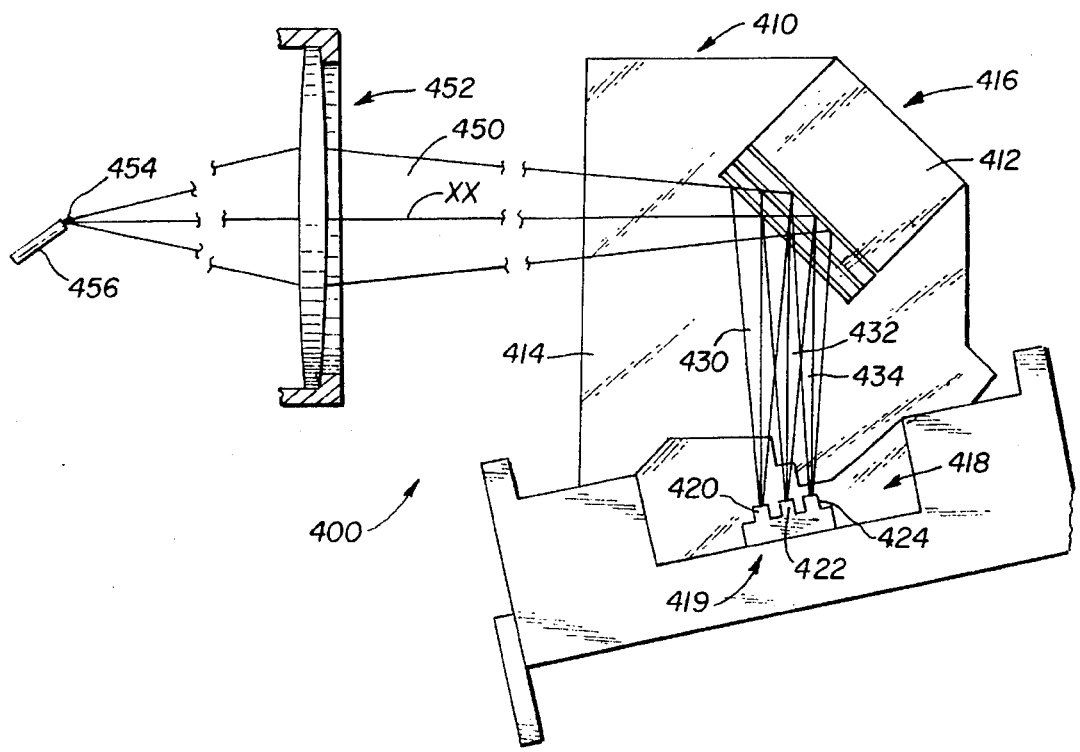
FIG. 9 is a side elevation view of a beam combiner and focusing assembly employing the beam combiner/path length compensator assembly of the present invention.

FIG. 9 illustrates the applicability of the present invention to beam combiners of the type disclosed in U.S. Pat. No. 4,870,268 incorporated by reference above. The beam combiner and focusing assembly 400 of FIG. 9 may comprise a beam combiner/path length compensator assembly 410 which may be identical in construction to the beam splitter/path length compensator assembly 160 of FIG. 2 or the embodiment shown in FIG. 3.

Positioned below the beam combiner/path length compensator assembly 410 is a color component light source means 419. The color component light source means 419 may comprise a blue light source 420, a green light source 422, and a red light source 424 which may correspond in configuration and position to the linear photosensor arrays 152, 154, 156 described above with reference to FIGS. 2 and 3. Each of the light sources 420, 422, 424 emits a corresponding color component beam 430, 432, 434, respectively, which passes through the path length compensator means 418 of the beam combiner/path length compensator assembly 410.

The beam combiner/path length compensator assembly 410 may comprise beam combiner means 412 having a plurality of component beam reflecting layers 440, 442, 444 disposed obliquely in the paths of color component optical beams 430, 432, 434 for combining the color component optical beams 430, 432, 434 into a combined optical beam 450 having a unitary optical axis AA. The beam combiner/ path length compensator assembly 410 may also comprise a unitary path length compensator device 414. The path length compensator device 414 may comprise a beam combiner housing means 416 for securely holding the beam combiner means 412 and for spatially separating said the beam combiner means 412 from the color component light source means 419. The path length compensator device 414 may also comprise a path length compensator means 418 disposed between the beam combiner means 126 and the component light source means 119 for refractively compensating for differences in optical path lengths of the plurality of color component optical beams 430, 432, 434.

The beam combiner and focusing assembly 400 may also comprise a focusing means 452 such as a lens assembly for focusing the combined light beam 450 to a common focal point 454, which may be positioned at the end of an optical fiber 456 which is used to transmit the combined light beam 450 to a remote location.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

We claim:

1. A beam splitter/path length compensator assembly for use in a color imaging assembly comprising:

beam splitter means for splitting a polychromatic imaging light beam into a plurality of color component beams;

integrally formed, transparent path length compensator device comprising a path length compensator means for differentially adjusting the focus distances of said color component beams;

said beam splitter means being fixedly encased within said path length compensator device without application of adhesive to said path length compensator device in regions thereof which are intersected by said imaging light beam.

2. The invention of claim 1, said path length compensator device comprising a molded plastic device, said beam splitter means comprising a planar glass surface directly interfacing with a surface portion of said molded plastic device whereby stresses on said planar glass surface of said beam splitter means which are associated with adhesive attachment of said planar glass surface to an adjacent surface of a path length compensator with a separate adhesive medium are obviated.

3. A beam splitter/path length compensator assembly for use in a color imaging assembly for forming spatially separated, color component images of an object on a unitary image plane, said beam splitter/path length compensator assembly comprising:

a) beam splitter means having a plurality of parallel, color component beam reflecting layers disposed obliquely in the path of a polychromatic light beam for splitting said polychromatic imaging light beam into a plurality of parallel, spatially and spectrally separated, color component beams having optical axes positioned perpendicular to said unitary image plane;

b) a unitary, integrally formed path length compensator device comprising:

i) beam splitter housing means for securely, nonadhesively holding said beam splitter means in fixed relationship with said unitary image plane and for spatially separating said beam splitter means from said unitary image plane; and ii) path length compensator means disposed between said beam splitter means and said unitary image plane for refractively compensating for differences in optical path lengths of said plurality of color component beams, whereby each of said color component beams provides a focused color component image of said object on said unitary image plane.

4. The invention of claim 3, said beam splitter housing means comprising a cavity, said cavity comprising a bottom wall, a first sidewall, and a second sidewall, wherein said beam splitter is partially encased within said cavity and is securely, compressively held within said cavity.

5. The invention of claim 3, said beam splitter housing means comprising a cavity, said cavity comprising a bottom wall, a top wall, a first sidewall, and a second sidewall, wherein said beam splitter is fully encased within said cavity and is securely, compressively held within said cavity.

* * * * *